United States Patent [19]

Tan et al.

[11] Patent Number: 4,884,532
[45] Date of Patent: Dec. 5, 1989

[54] SWINGING-PISTON INTERNAL-COMBUSTION ENGINE

[76] Inventors: Cheng Tan; Lihua Jiang, both of No. 6 Nong 128, Xizhijie, Changzhou City, China

[21] Appl. No.: 180,611

[22] Filed: Apr. 4, 1988

Related U.S. Application Data

[63] Continuation of Ser. No. 847,151, Apr. 1, 1986, abandoned.

[30] Foreign Application Priority Data

Apr. 1, 1985 [CN] China .................. 85100486

[51] Int. Cl.[4] ............................................. F02B 53/00
[52] U.S. Cl. .................... 123/18 R; 123/61 R; 92/125
[58] Field of Search ............. 123/18 R, 193 R, 193 P, 123/53 A, 53 B, 53 BP, 56 A, 56 B, 61 R, 63; 92/124, 125

[56] References Cited

U.S. PATENT DOCUMENTS

| 484,629 | 10/1892 | Costa | 92/124 |
|---|---|---|---|
| 1,037,094 | 8/1912 | Williams | 123/18 R |
| 2,387,467 | 10/1945 | Reiter | 123/18 A |
| 3,338,137 | 8/1967 | James | 123/18 R |
| 3,388,693 | 6/1968 | James | 123/18 R |
| 3,945,348 | 3/1976 | Balve | 123/18 R |
| 4,599,772 | 7/1986 | Graham | 123/193 P |

FOREIGN PATENT DOCUMENTS

| 2019769 | 11/1970 | Fed. Rep. of Germany . | |
| 2375439 | 7/1978 | France . | |
| 564265 | 6/1957 | Italy | 123/18 R |
| 577656 | 5/1946 | United Kingdom | 123/18 R |

Primary Examiner—David A. Okonsky
Attorney, Agent, or Firm—Ladas & Parry

[57] ABSTRACT

A swinging-piston ICE comprising a swinging piston (3), connecting rod (2), intake port (16) and exhaust ports (17). Combustion chambers (A,C) are formed on opposite sides of the piston (3) where oil nozzles (13) are provided. The piston is sealed at its end surfaces (3c) and along the cylindrical surface (3d) wherein transfer ports (N) are provided. A slide shoe (15) opposite the transfer ports is provided for blocking the exhaust ports.

1 Claim, 2 Drawing Sheets

SWINGING-PISTON INTERNAL-COMBUSTION ENGINE

This is a continuation of co-pending application Ser. No. 847,151 filed on Apr. 1, 1986 and now abandoned.

BACKGROUND OF THE INVENTION

This invention relates to a multi-cylinder internal-combustion engine with a swinging piston.

FRG Patent No. 1,601,818 and U.S. Pat. No. 3,388,963 to James disclosed a swinging-piston, supposedly two-cylinder gasoline engine with a connecting rod and crank mechanism and spark plugs for ignition. In that design, the swinging piston actually forms four cylinders, the top two of which are for admission and compression and, therefore, act as scavenger pumps, and the bottom two of which are operating cylinders. The engine works on the principle of two-stroke cycles. It has, however, the following disadvantages:

1. The problem of scavenging between the admission and compression cylinders and the operating cylinders has not been solved properly. Three types of scavenging structures are used therein: air valves and springs and two others. Using air valves and springs to form an automatic valve to control air intake requires a complicated structure and great mass. Further, an engine having such a valve system can only be operated at lower speeds. Furthermore, the valve system cannot be applied to a reciprocating air compressor, because the pressure loss of the air motion is too large to be acceptable. The other two structures, using intake port scavenging, have some troubles in air sealing, which cause lower efficiency of the engine and make it operate improperly, owing to too much air leakage.

2. The exhaust gas from the operating cylinders has not been properly taken into account. In every working stroke, the exhaust ports communicate with the crankcase, and as a result, the lubricating oil in the crank case is polluted by the exhaust gases and part of the lubricating oil is carried away through the exhaust pipe.

3. The admission and compression cylinders use one, common admission port, which is located at the middle of the cylinders, and the effective stroke of air intake in each cycle is, therefore, short. The air intake amount is, therefore, too small to meet the demand of the operating cylinders, resulting in much lower power and efficiency of the engine. If supercharging were adopted and compressed air were led into the admission port, the top part structure of the engine would be unnecessary.

4. Finally, some parts of the engine cannot be made strong enough; specifically, the swinging-piston sealing and cooling devices.

In French patent No. 2,375,439, a swinging-piston and connecting-rod crank mechanism is proposed wherein the swinging piston forms four cylinders, the top two being operating ones, and the bottom two being admission and compression ones which act as scavenger pumps. In the swinging piston, there are intake ports, which intake air automatically from outside and form uniflow scavenging for the operating cylinders. This results in double-cylinder, two-stroke operation, whereby the engine can work at higher speeds. The disadvantage of this is, however, that the effective stroke is so short that the efficiency of the engine is greatly lowered. Moreover, since the crankcase communicates with the admission cylinders, a large amount of lubricating oil can be brought into the operating cylinders.

SUMMARY OF THE INVENTION

Considering all these disadvantages of existing swinging-piston internal-combustion engines, the object of the present invention is to offer a new type of swinging-piston, internal-combustion engine, which has a higher output, mall weight and size, simple structure and good performance. It also can be adapted to use various fuels and for many purposes.

According to the present invention, a swinging-piston engine has a crank and connecting-rod mechanism in which one connecting rod links the crank to one swinging piston which could sweep four cylinders. The engine has good sealing and lubricating performances, including internal cooling of the piston structure. Two combustion chambers of respective cylinders swept by the piston are designed on the basis of any of the suitable types of combustion chambers of reciprocating engines. The engine can work in double-stroke cycles. The balance of the engine is excellent. Complete balance of inertia forces and moments of inertia of the engine can be realized. As a result, the rotation speed of the engine can be increased. Because a single connecting rod is driven by two cylinders, its output moment is much smoother than that of a reciprocating two-cylinder engine and its power greater, but the maximum force acting on the rod is much less than that of the reciprocating engine, all of which greatly improves the working condition of the bearings of the connecting rod and crank. The main contour of the engine is circular, too, which makes it easier to fabricate and lower in cost.

In addition, the other two cylinders can be used to make a double-stroke engine in which uniflow scavenging via intake ports is used. This type of construction is more useful in making a high-power engine with multiple swinging pistons in tandem.

Owing to the high output, light weight, small size and good operating performances, the new engines described herein are particularly useful in locomotives, ships, agricultural machines and automobiles.

According to the present invention, the swinging piston swings around a fixed shaft, instead of having the reciprocating piston motion of reciprocating engines. The new engine still keeps the crank and connecting-rod structure of the latter, however. The swinging piston could sweep through four cylinders. The operation of the cylinders is controlled by the crank and connecting rod.

For a swinging-piston two-stroke engine, however, the piston sweeps two operating or combustion cylinders, each having an admission and an exhaust port. For a swinging-piston two-stroke Diesel engine, intake port scavenging is used. The lower part of the piston of such an engine is provided with a ring segment, which shields the exhaust gas ports when no engine scavenging to these is needed. Each cylinder works in the same way as in a reciprocating two-stroke engine: admission, compression, oil injection and combustion, expansion, and exhaust.

The engine according to the present invention to the present invention retains the following characteristics and advantages of reciprocating engines:

Because the motive parts, i.e. crank, connecting rod and combustion-cylinder operation, are similar to those of a reciprocating engine, the new engine can be designed and fabricated on the basis of knowledge of and experience with reciprocating engines. It therefore, has high reliability and good sealing, cooling and lubricating similar to a reciprocating engine.

The peripheral and end sealing is realized by plurality of surface-contact strips, interconnection therebetween being assured by small cylinders which are pushed against the side walls by springs. The main contour of the cylinders is circular, which can reduce radial jumping of the seal strips, so that the inertia force acting on the seal strips and the restoring force of the springs almost remain constant.

In each operating cycle of the cylinder, lubricating oil can be applied to the wall of the cylinder, just as in a reciprocating engine. Then, the oil can be recollected by oil sealing ones of the seal strips.

Water can be used for cooling of the shell of the cylinders. For the swinging piston, either water or oil can be used. The cooling channels can be big enough to pass the cooling water or pressure oil for cooling and lubricating.

The whole engine is very compact.

The combustion conditions of the engine are very similar to those of a reciprocating engine.

The engine according to the present invention is also superior to a reciprocating engine and has some new characteristics and advantages, which are as follows:

The engine uses one swinging piston connecting rod and crank for two operating cylinders. If the engine works in a two-stroke cycle, therefore, work is two times per rotation of the crank. Under the same conditions, work is done only once per rotation of the crank for a reciprocating engine. Therefore, twice the work is done by the new engine as by the reciprocating engine, and its output moment is smoother than that of the reciprocating engine, too.

The crank and connecting-rod mechanism of the present-invention engine is very compact. The rod is shorter than that of a reciprocating engine. Therefore, the height of the new engine can be less. Owing to the fact that each piston forms two operating cylinders, the engine space is used more effectively, too. This results in a much higher working volume and much higher power to weight ratios for the engine of the present invention, or results in much lighter weight and smaller size for the same output power, as compared to a reciprocating engine.

By operating on the swinging principle, the new engine can completely balance the inertia force acting on the moving parts by attaching counter-weights to the crank and piston. Therefore, the rotation speed can be increased. Even though the sum of the inertia forces acting on the swinging piston is zero, there is a periodically varying moment of inertia, which is $Mu=j_c\epsilon$, where Mu is the rotational inertia of the piston around its pivot, $j_c$ is a constant, and $\epsilon$ is the instantaneous angular acceleration of the piston. To avoid engine vibration, the moment of inertia should be considered in addition to the inertia forces. Multiple pistons can be used for this, by being arranged symmetrically, e.g. when a piston swings from left to right, another swings from right to left to balance their moments of inertia. Therefore, for a single-piston engine, the inertia forces can be in complete balance. For a multi-piston engine, both the inertia forces and the moments of inertia can be balanced. Therefore, the balance of the engine is excellent and easy to realize.

During the working processes of the piston, i.e. compression and combustion expansion, there are big lateral-side pressures. To accommodate these in a reciprocating engine, there is tight tolerance between the piston and cylinder wall, which causes wearing between the piston and the cylinder wall, results in loss of mechanical work, and limits the linear speed of the piston of the reciprocating engine. One side of the piston of the engine of the invention is, however, supported by bearings, and there is, therefore, no wearing or mechanical loss on this side of the piston. Consequently the crank-rotation speed can be increased.

The engine herein uses only one piston, instead of two, for a two-cylinder engine, resulting in a much simpler mechanism.

The swinging piston also has the function of a flywheel (energy storage) in using the inertia force of its swinging motion to balance the peak gas pressure. Therefore, the maximum force of the piston on the connecting rod is reduced, and the loading condition of the rod is improved. The output moment of the crank is smoothed by this, too, even when only one piston is used. The moment of inertia of the engine is also kept in balance with the peak loading of the gas from the swinging motion of the piston. In a reciprocating engine, the inertia force of the piston could be kept in balance with gas pressure only when the piston was near the upper dead point of its compression and expansion strokes.

Such characteristics give much benefit to a high-power engine with a high compression ration. On one hand, the loading force on the connecting rod can be reduced and the compression ratio can be increased; on the other hand, because the resulting gas pressure is high, its inertia force couple is large and the rotation speed of the engine for a given piston material can be increased, whereby the power of the engine is further increased.

Because the piston of the engine of the combustion chambers can be optimized. Therefore, the thermal efficiency of the engine should be higher. Moreover, owing to the facts that one connecting rod is driven by two cylinders, the piston is supported by bearings, and the piston itself does not contact with the cylinder walls, mechanical efficiency should be higher, too. As a result, the effective efficiency of the engine should be high.

Generally speaking, therefore, the new engine has simpler structure, higher power and rotation speed, and smoother operation and output moment than a reciprocating engine. At the same time, the force loading of the connecting rod and crank does not go up, but goes down, instead. These characteristics are especially important to a high-power and high-speed engine, because they make the life of its parts longer, and higher rotation speed and power can be gained with fewer pistons, too.

Perpendicular thumping noise is the main noise source for a reciprocating engine. The engine of the invention has reduced noise emission, therefore.

DESCRIPTION OF THE PREFERRED EMBODIMENTS

Figure 1:
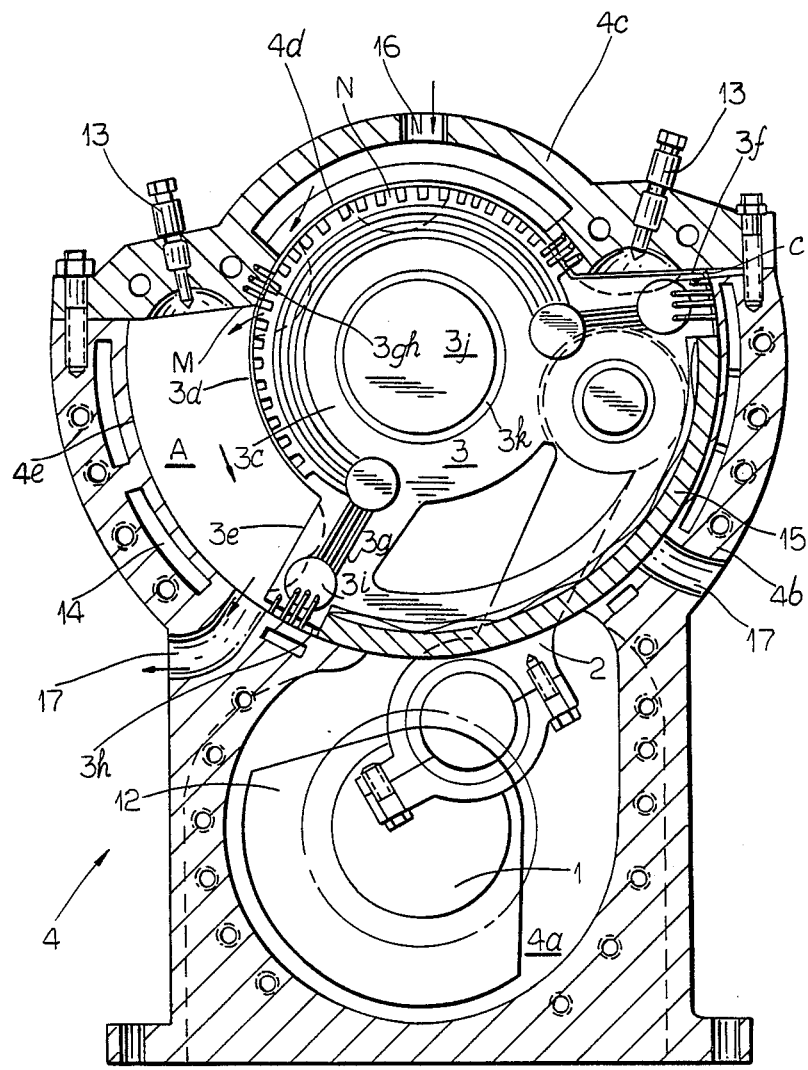
FIG. 1 is an end elevation, partly in cross section, of one preferred embodiment of this invention, which is a two-stroke gas-port-scavenging Diesel engine with self-admission ability.

FIG. 1 shows a swinging-piston two-stroke engine which can use gasoline, gas, natural gas, or even, as intended, diesel fuel as fuel.

The engine has a cylinder body or block at 4. The cylinder body has two, parallel, planar end walls 4a (only one shown), a middle part 4b between the end walls, and a head 4c, also between the end walls, on one, upper side of the middle part. The head 4c and middle part 4b have a little cylindrical inner surface 4d and a coaxial, big cylindrical inner surface 4e, respectively, for defining two inner spaces within the cylinder body.

A piston 3 is rotatable about a cylindrical shaft or piston pin 3j on a liner 3k therebetween. The cylindrical shaft 3j is supported between the end walls 4a co-axially of the cylindrical inner surfaces 4d, 4e of the middle part and head of the cylinder body.

A crankshaft 1 is also rotatably supported between the end walls 4a, parallel to the cylindrical shaft 3j, in another inner space of the cylinder body, which is lowermore in FIG. 1. A connecting rod 2 connects the crankshaft 1 to the piston 3 to swing the piston back and forth about the cylindrical shaft 3j as the crankshaft rotates. A counterweight 12 is rotatable with the crankshaft 1 for dynamic balance of the crankshaft, connecting rod and piston system.

The piston 3 has opposite end surfaces 3c (only one shown) at the planar end walls 4a and a cylindrical surface 3d between its end surfaces, which is spaced inside the cylindrical inner surfaces 4e, 4d of the middle part and head 4b, 4c of the cylinder body. Two generally opposite, radially extending portions 3e of the piston project from the surface 3d of the piston to respective ends at the big inner surface 4e of the middle part of the cylinder body.

Thus, the cylinder body 4 consists of a cylindrical middle shell (middle part 4b and head 4c) and the end walls 4a. The head separates two adjacent cylinders A, C and is assembled and fixed to the middle shell by screws and pins. The end walls have pedestal holes (not shown) for bearings (not shown) which support the piston linear and crank.

The piston 3 has a central boring having the liner 3k fixed therein and slideably swingable freely on the cylindrical shaft 3j. The variable, working volumes of the two cylinders A, C are formed between radially extending portions 3e, 3f of the piston and the cylinder head 4c. Their operation is controlled by the crank and connecting-rod mechanism. On the radially extending portions 3e, 3f and end surfaces 3c of the piston are radial and end sealing strips 3g, 3h which are urged outward of the piston for sealing to the adjacent big cylindrical and end surfaces by springs (not shown) to keep surface contact between the sealing strips and the inner sides of these surfaces about the cylinders A,C. A plurality of strips can be used, as shown. Interconnection of the radial and end sealing is completed by cylindrical pins 3i, which are pushed out by springs. At the interconnection, there is a little gap for expansion due to heating. As shown in FIG. 1, the cylinder head 4c also has a region E adjacent each cylinder A,C which is sealed, not by the sealing strips of the piston, but by similar sealing strips 3gh sprung from the wall of the cylinder head region against the piston.

Either water cooling or oil cooling can be used, but a water cooling system 14 is shown in FIG. 1.

Both ends of the crank shaft 1 are supported in the end walls 4a by bearings (not shown). A counterweight 12 is attached to the crank to achieve static and dynamic balance. On the output end (not shown) of the crank shaft can be a flywheel (not shown).

The embodiment of FIG. 1 is a swinging-piston two-cylinder diesel engine of two-stroke and air-port-through-scavenging operation. Diesel oil injectors 13 provide the fuel to the cylinders A, C. An admission port 16 in the head 4C provides air to each cylinder A, C via head-adjacent grooves 4d in the piston 3. A slide shoe 15 on the opposite side of the piston 3 from the grooves 4d, between the radial piston projections 3d, 3f alternately blocks an exhaust port 17 from each cylinder.

The structure is the simplest one possible, therefore, but it needs a supercharger or scavenger pump (not shown), because it has no self-intake ability.

In operation, the structure may induce unbalanced centrifugal force, but the main component of the force is oriented vertically downward, and does not cause severe vibration of the engine.

The lower part of the piston and connecting rod can be made of light alloys. While maintaining the necessary strength and rigidity, this reduces the mass of the lower part of the piston system to a minimum. In order to increase the mass of the upper part of the piston, a double-metal built-up piston (not shown) could be used. With good design this would make it possible to achieve balance of the inertia forces. For a multi-swinging piston tandem engine (FIG. 2), it is possible to achieve complete balance of the inertia forces and the moments of inertia of the engine.

For the two-cylinder two-stroke engine of FIG. 1, the piston plays all or part of the role of a flywheel, because its inertia is used to absorb part of peak cylinder-compression loading. As a result, the output moment is very smooth.

The engine has good sealing, cooling, lubricating and combusting. It uses a long stroke and air-port through-scavenging. It uses diesel oil as fuel. Therefore, its combustion and thermal efficiency is high. The engine could be designed to use gasoline, coal gas or natural gas, however.

The engine shown in FIG. 1 uses a high pressure supercharger (not shown) to increase engine output. In this case, when the intake channel through the grooves 4d on the upper cylindrical wall of the piston is opened, the exhaust port is still closed. Because the combustion pressure is still high, however, proper design can make the intake and combustion pressures almost equal on both sides of the intake channel at piston region E, so that the fresh air won't flow into the cylinders, and the gas of combustion won't flow back into the intake channel. Then the exhaust port is opened, after the piston has swung as shown on the left of FIG. 1, and exhaust discharging and scavenging occur. When the exhaust port is closed, as the piston swings back, pressure boost occurs, because the intake channel is still open.

Figure 2:
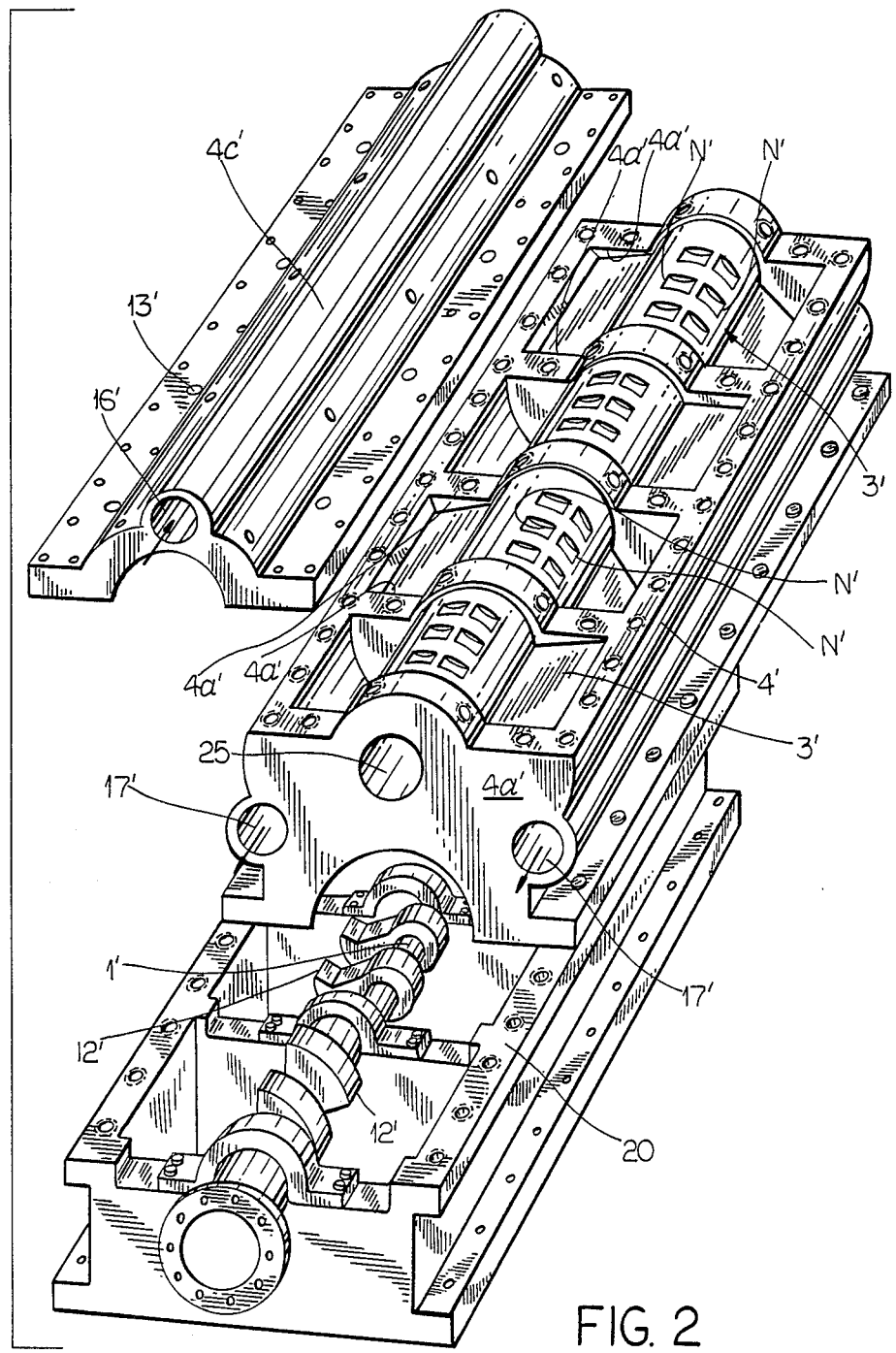
FIG. 2 is an exploded perspective view of another preferred embodiment.

The embodiment of FIG. 2 is a four-connecting-rod eight-cylinder engine with two-stroke and air-port-through-scavenging operation similar to FIG. 1, and therefore, not fully described again, but labeled with corresponding but primed reference characters.

The engine includes a plurality of connecting-rod and swinging-piston units in tandem. There are two operating cylinders for each piston 3', as before, in the cylinder body 4'. The whole engine forms a multi-cylinder two-stroke engine with air-port-through-scavenging.

In FIG. 2, m and n are air-intake ports, like grooves 4d in FIG. 1. Bearings 25 for the pistons are shown in one end wall 4a'.

Thus, the engine shown in FIG. 2 is a four-connecting, eight-cylinder engine. It has a separate pedestal 20 for the cylinder body 4'.

In the embodiments described above, gasoline, diesel oil, natural gas, coal gas and various other fuels can be used. The engines can be used in automobiles, tractors, ships of different sizes, various electric power stations, locomotives, agricultural machines, mining machines, forestry machines, hoisting machines, motorcycles, etc.

What we claim is:

1. A swinging-piston internal-combustion engine, comprising a crankshaft (1) supported in a cylinder body (4) formed by two planar end walls (4a), a middle part (4b) and a the latter two defining bid and little coaxial cylindrical inner surfaces (4e, 4d), respectively, a cylindrical shaft (3f) supported between the end walls, a swinging piston (3) pivotably mounted on the cylindrical shaft, a connecting rod (2) connecting the piston with the crankshaft, an intake port (16) in the head (4c), oil nozzles (13) mounted on the cylinder body for combustion chambers (A, C) on opposite sides of the intake port, exhaust ports (17) in the cylinder body (4) for the combustion chambers, end surfaces (3c) on the swinging piston at the end walls, a cylindrical surface (3d) between the end surfaces of the swinging piston, two radially-extending portions (3e, 3f) sealingly projecting from the cylindrical surface of the swinging piston to the big cylindrical inner surface for defining a variable, working volume of the combustion chambers, two regions (M) of the head for sealing to the cylindrical surface of the swinging piston at the combustion chambers (A, C), transfer ports (N) on one side of the cylindrical surface of the swinging piston at the head for providing air from the intake port to each combustion chamber, and a slide shoe (15) on the opposite side of the swinging piston from the transfer ports and between the radially extending portions of the swinging piston for blocking the exhaust ports, whereby to complete uniflow scavenging of the combustion cylinders.

* * * * *

UNITED STATES PATENT AND TRADEMARK OFFICE
CERTIFICATE OF CORRECTION

PATENT NO. : 4,884,532

DATED : December 5, 1989

INVENTOR(S) : Cheng TAN et al

It is certified that error appears in the above-identified patent and that said Letters Patent is hereby corrected as shown below:

Claim 1, line 4, after "a" insert -- head (4c), -- and "bid" should be -- big --.

Signed and Sealed this

Twelfth Day of February, 1991

*Attest:*

HARRY F. MANBECK, JR.

*Attesting Officer*     *Commissioner of Patents and Trademarks*